United States Patent [19]

Rabon

[11] 4,056,802
[45] Nov. 1, 1977

[54] SONAR ALARM SYSTEM

[75] Inventor: James L. Rabon, Panama City, Fla.

[73] Assignee: The United States of America as represented by the Secretary of the Navy, Washington, D.C.

[21] Appl. No.: 665,653

[22] Filed: Mar. 10, 1976

[51] Int. Cl.² .............................................. G01S 9/66
[52] U.S. Cl. .................................... 340/3 R; 340/3 C
[58] Field of Search ...................... 340/1 R, 3 R, 3 F; 343/5 CM

[56] References Cited

U.S. PATENT DOCUMENTS

| 3,321,737 | 5/1967 | Russell | 340/1 R |
| 3,922,631 | 11/1975 | Thompson et al. | 340/3 R |

FOREIGN PATENT DOCUMENTS 907,554  10/1962  United Kingdom ................ 340/1 R Primary Examiner—Richard A. Farley
Attorney, Agent, or Firm—Richard S. Sciascia; Don D. Doty; Harvey A. David

[57] ABSTRACT

A sonar system is disclosed which processes received sonic energy echo signals in such manner as to determine whether or not a marine mine or other object of significance is laying on a particular area of sea floor being sonically scanned or searched and, in addition, whether or not said marine mine or other object has a sonic energy shadow behind it. If and when such two conditions are met, an alarm is given to the human operator monitoring the subject sonar system, so as to call his attention to the fact that a target of significance has been acquired.

3 Claims, 6 Drawing Figures

SONAR ALARM SYSTEM

STATEMENT OF GOVERNMENT INTEREST

The invention described herein may be manufactured and used by or for the Government of the United States of America for governmental purposes without the payment of any royalties thereon or therefor.

FIELD OF THE INVENTION

In general, the present invention relates to alarm systems and, in particular, is an automatic alarm system which calls the attention of an operator or an observer to the fact that some particular event or series of events is occurring. In even greater particularity, the subject invention comprises an automatic target detection and alarm system that may be combined to an advantage with side-looking sonar systems.

DESCRIPTION OF THE PRIOR ART

Heretofore, numerous alarm systems have been employed for various and sundry purposes; however, insofar as it is known, no target detector and alarm systems are available for side-looking and side-scanning sonar systems, other than the conventional readouts--such as, for example, oscilloscopes, oscillographs, strip chart recorders, and the like, along with a few change of state alarm bells, lights, etc., which are monitored by human operators. However, although the subject invention may be used for other purposes and in combination with other devices, the reverse does not appear to be true, and, thus, no known prior art devices will ostensively perform the functions that the instant invention performs in conjunction with side-looking and other angular-scanning sonar systems. Consequently, no other prior art will be discussed at this time.

SUMMARY OF THE INVENTION

The present invention, as previously suggested, may overcome some of the disadvantages of prior art alarm systems for devices other than side-looking sonar systems (since its utility is not intended to be limited thereto) and, in addition, facilitates the automatic detection and indication of the presence of targets acquired by side-look and other angular scanning sonar systems. As such, it undoubtedly constitutes an improvement of significance with respect thereto.

Since side-looking sonar systems usually operate at a more or less fixed height above the sea bottom and look outward from one or both sides of the carrier vehicle, any object rising above the sea bottom will both reflect back a portion of the sound energy striking it and, in addition, cast an acoustic shadow by blocking the sonic energy from striking the sea bottom directly behind the object. If the sonar transmissions are synchronized with a fascimile-type recorder or storage-type cathode ray tube (CRT), so that each succeeding sweep is printed adjacent to the last, and the speed of the carrier vehicle is matched properly with the sweep speeds of the chart or CRT, then a linear map of the sea bottom to either side of the carrier vehicle will be displayed. The more intense spots on the display represent sonic reflections—that is, highlights—from solid objects or the sea bottom, and very low intensity or dark areas represent the absence of sound reflections—that is, shadows.

In view of the foregoing, the subject automatic alarm circuit was constructed in such manner as to use all of such signal characteristics, in order to determine more accurately whether a given sonar echo or return signal is a target or not. Thus, the criteria which the instant invention uses for automatically detecting a target object are as follows:

1. Is the reflected sound level from the object greater than the reflected sound level from the surrounding bottom?

2. If so, does a blank area (shadow) immediately follow the reflected sound signal (highlight)?

3. Does the suspected target appear at about the same place on several succeeding search signal sweeps? Logic and timing circuits subject incoming sonar data or information echo signals to certain tests to ascertain if the three above described conditions are met, thereby determining whether or not a desired target object has been acquired.

It is, therefore, an object of this invention to provide a new and improved alarm system.

Another object of this invention is to provide a unique target detection and alarm system for side-looking and other sonar systems.

Still another object of this invention is to provide an improved method and means for detecting and indicating the change of state of a predetermined parameter.

Another object of this invention is to provide a method and means for detecting and indicating one or more targets acquired by side-looking sonar systems, side-looking or angular-scanning radar systems, or other substantially comparable echo-ranging-search systems, regardless of the type of energy or energies employed as the search and echo signals thereby.

Still another object of this invention is to provide an improved side or angular sonar system.

Still another object of this invention is to provide an improved side or angular echo-search system.

A further object of this invention is to provide a method and means for automatically detecting and indicating an object having a predetermined energy reflective surface, a shadow of said energy in juxtaposition therewith, and a background otherwise capable of reflecting said energy.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1A:
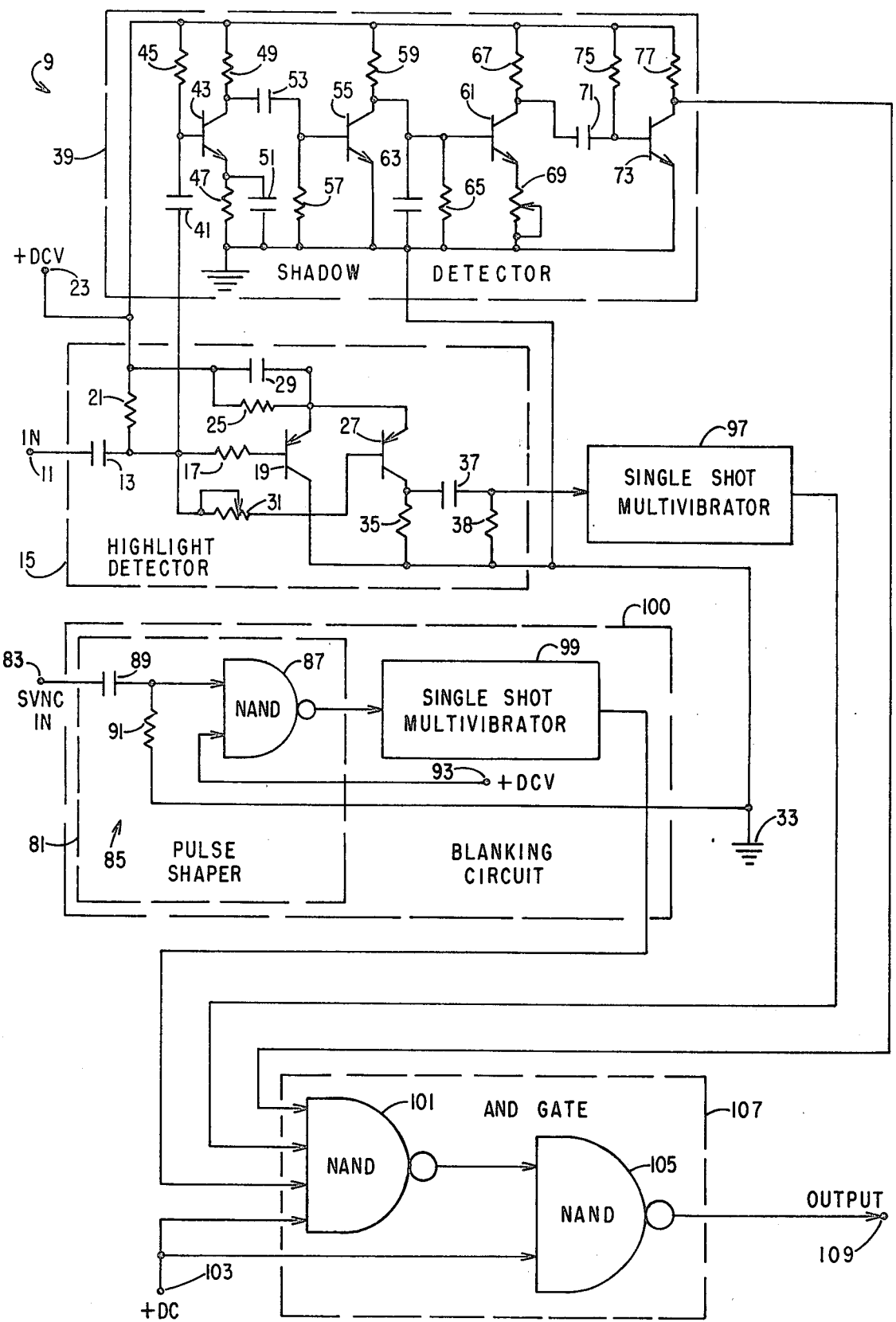
FIG. 1 (A and B) is a combination schematic and block diagram of the automatic target detector and alarm circuit positions of the invention.
Figure 1:
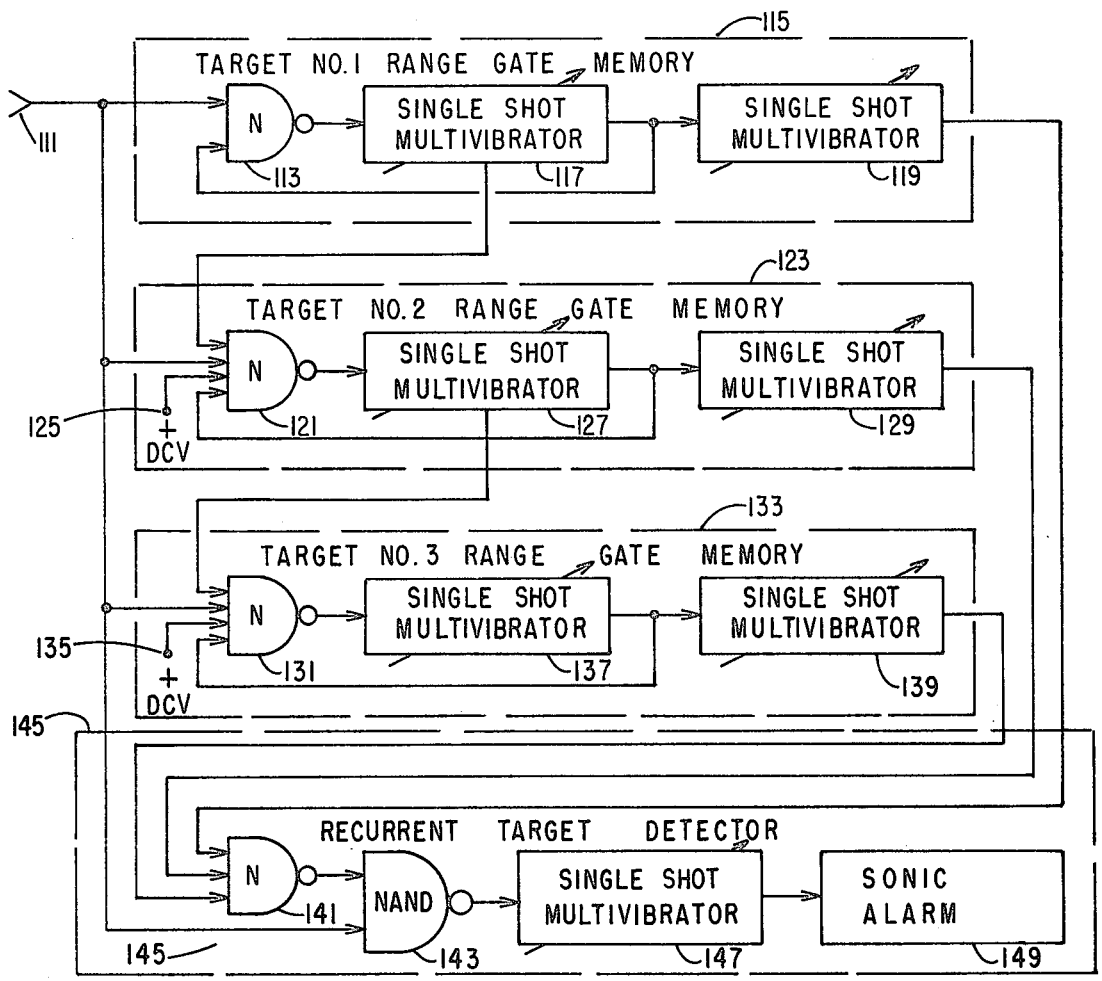

Referring now to FIG. 1(A), automatic target alarm 9 is shown as having a data input terminal 11 that is connected to one plate of a coupling capacitor 13 of a highlight detector 15, with the other plate of said capacitor 13 connected to one terminal of a resistance 17, the other terminal of which is connected to the base of a 2N1309 PNP transistor 19. Another resistance 21 is connected between a predetermined positive direct current voltage (DCV) 23 and the interconnection of said capacitor 13 and resistor 17, and still another resistance 25 is connected between DCV 23 and the emitter of said transistor 19 and the emitter of a 2N1309 PNP transistor 27. A capacitance 29 is connected in parallel with said resistance 25. A variable resistance 31 is connected between the interconnection of said capacitance 13 and resistance 17 and the base of the aforesaid transistor 27. The collector of transistor 19 is connected to a ground 33, and the collector of transistor 27 is connected through a resistance 35 to said ground 33. The collector of transistor 27 is connected to one plate of a coupling capacitance 37, the other plate of which is connected through a resistance 38 to said ground 33. Said other plate of capacitance 37 constitutes the output of highlight detector 15.

The aforesaid interconnection of capacitance 13 and resistance 17 is connected to the input of a shadow detector 39 and, more specifically, to one plate of a capacitance 41 thereof. The other plate of capacitance 41 is connected to the base of a 2N1893 NPN transistor 43 and through a resistance 45 to the aforesaid direct current voltage (DCV) 23. The emitter of transistor 43 is connected through a resistance 47 to ground 33, and the collector thereof is connected through a resistance 49 to said DCV 23. A capacitance 51 is connected in parallel with resistance 47, and a coupling capacitance 53 is connected between the collector of transistor 43 and the base of a 2N1893 NPN transistor 55. A resistance 57 is connected between the base of transistor 55 and ground 33, and the emitter thereof is directly connected to said ground. The collector of transistor 55 is connected through a resistance 59 to DCV 23 and to the base of a 2N1893 NPN transistor 61. The collector of transistor 55 is also connected through a capacitance 63 to ground 33, and a resistance 65 is connected in parallel with said capacitance 63. The collector of transistor 61 is connected through a resistance 67 to DCV 23, and the emitter thereof is connected through a variable resistance 69 to ground 33. The collector of transistor 61 is connected through another coupling capacitance 71 to the base of a 2N1893 NPN transistor 73. The base of transistor 73 is connected through a resistance 75 to DCV 23, the collector thereof is connected through a resistance 77 to said DCV 23, and the emitter thereof is directly connected to said ground 33. Of course, as may readily be seen, the collector of transistor 73 constitutes the output of shadow detector 39.

Included in the subject invention is a pulse shaper 81, the input to which is a terminal 83, to which is supplied a predetermined synchronization (sync) signal from any given sync signal generator or other utilization apparatus, including the subject side-looking sonar system itself if so desired. Said sync signal will be discussed more fully subsequently. Suffice to say at this time, that sync signal input terminal 83 is connected through a pulse shaping differentiating circuit 85 to a NAND gate 87. As shown, terminal 83 is connected through a capacitance 89 to one of the inputs of said NAND gate 87, the latter of which is connected through a resistance 91 to the aforesaid ground 33. The other input of NAND gate 87 is connected to some predetermined positive direct current voltage 93, and the output of NAND gate 87 constitutes the output of pulse shaper circuit 81.

The output of the aforementioned highlight detector 15 is the interconnection of capacitance 37 and resistance 38, and it is connected to the input of a single shot multivibrator 97.

As previously mentioned, the output of pulse shaper 81 is the output of NAND gate 87, and it is connected to the inut of a single shot multivibrator 99. When so combined, pulse shaper 81 and single shot multivibrator 99 constitute a blanking circuit 100.

The outputs of the aforesaid shadow detector 39, single shot multivibrator 97, and single shot multivibrator 99 are respectively connected to a trio of inputs of another NAND gate 101, the fourth input of which is connected to some predetermined positive direct current voltage (DCV) 103. The output of NAND gate 101 is connected to one of the inputs of still another NAND gate 105, the other input of which is connected to the aforesaid DCV 103. Of course, as arranged and interconnected, NAND gates 101 and 105 ostensively constitute an AND gate 107; however, they are preferably connected in such manner for the sake of convenience of the solid state construction thereof.

FIG. 1(B) is, in fact, a continuation of FIG. 1(A); hence, output 109 of the latter is connected to input 111 of the former. Therefore, the output of NAND gate 105 of FIG. 1(A) is connected to one of the inputs of another NAND gate 113 of a target no. 1 range gate memory 115. The output of NAND gate 113 is connected to the input of an adjustable single shot multivibrator 117, one of the outputs of which is connected to the input of another single shot multivibrator 119 and the other input of the aforesaid NAND gate 113, and the other of the inputs of which is connected to one of the inputs of a NAND gate 121 of a target no. 2 range gate memory 123.

Another of the inputs of NAND gate 121 is connected to input 111—which, of course, makes it effectively connected to the output of NAND gate 105 of FIG. 1(A)—and still another of the inputs thereof is connected to a predetermined positive direct current voltage (DCV) 125. The output of NAND gate 121 is connected to the input of an adjustable single shot multivibrator 127, and one of the outputs of single shot multivibrator 127 is connected to the input of another single shot multivibrator 129 and to another input of the aforesaid NAND gate 121. The other output of single shot multivibrator 127 is connected to one of the inputs of a NAND gate 131 of a target no. 3 range gate memory 133.

Another of the inputs of NAND gate 131 is connected to the aforementioned input 111—which, of course, makes it effectively connected to the output of NAND gate 105 of FIG. 1(A). A third input of NAND gate 131 is connected to a predetermined positive direct current voltage (DCV) 135. The output of NAND gate 131 is connected to the input of an adjustable single shot multivibrator 137, the output of which is connected to the input of another single shot multivibrator 139 and to the remaining input of the aforesaid NAND gate 131.

The outputs of single shot multivibrators 119, 129, and 139 respectively constitute the outputs of targets number 1, 2, and 3 of range gate memories 115, 123, and 133, and each thereof is connected to one of a trio of inputs of a NAND gate 141 of a recurrent target detector circuit 143. The output of NAND gate 141 is connected to one of the inputs of a NAND gate 143, the other input of which is connected to the aforesaid input terminal, which, of course, as previously mentioned is connected to the output of NAND gate 105 of FIG. 1(A). Of course, like NAND gates 101 and 105, NAND gates 141 and 143, in fact, constitute another AND circuit 145. The output of NAND gate 143 is connected to the input of an adjustable singleshot multivibrator 147, with the output thereof connected to the input of any appropriate readout, indicator, recorder, or the like, such as a sonic alarm 149.

Figure 2:
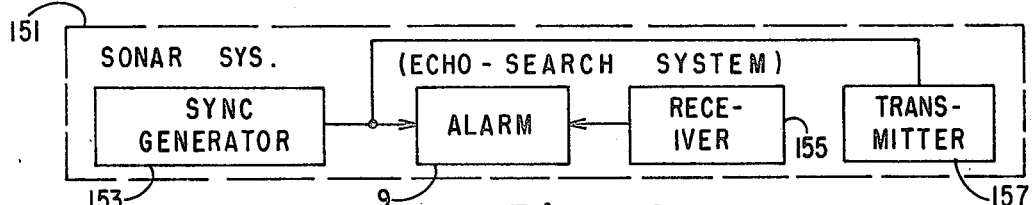
FIG. 2 is a block diagram of a sonar type echo-search-system which incorporates the detector and alarm of FIG. 1 therein.

Although, as previously suggested, the aforementioned alarm 9 has many uses in combination with many different devices and systems, FIG. 2, the preferred embodiment of the subject invention, incorporates it in combination with and echo-search system in general and, more specifically, in combination with a side-looking sonar system 151, inasmuch as it is so highly effective therewith. Hence, in FIG. 2, alarm system 9 is depicted as having its sync input connected to the output of a synchronization (sync) signal generator 153, with the other input thereof connected to the output of a sonar receiver 155. The output of sync generator 153 is also connected to the sync input of a sonar transmitter 157. Of course, sonar receiver 155 and sonar transmitter 157 may also be interconnected in any suitable manner by a transmit-receive (TR) switch or the like (not shown), as is conventional in the sonar art. Furthermore, sync generator 153 may be incorporated within sonar system 151 (as shown) or separate and external thereto, as desired.

Obviously, it would be well within the purview of one skilled in the art having the benefit of the teachings presented herewith to design said sync generator, receiver, and transmitter combination in whatever manner as would optimize the subject invention during any given operational circumstances.

At this time, it would appear to be noteworthy that all of the elements and components portrayed in FIGS. 1(A) and (B) and in FIG. 2 are well known, conventional, and commercially available. Therefore, it is to be understood that it is their unique interconnections and interactions which effect the subject invention and cause it to accomplish the above mentioned objectives.

MODE OF OPERATION

The operation of the instant invention will now be discussed briefly in conjunction with all of the figures of the drawing.

Figure 4:
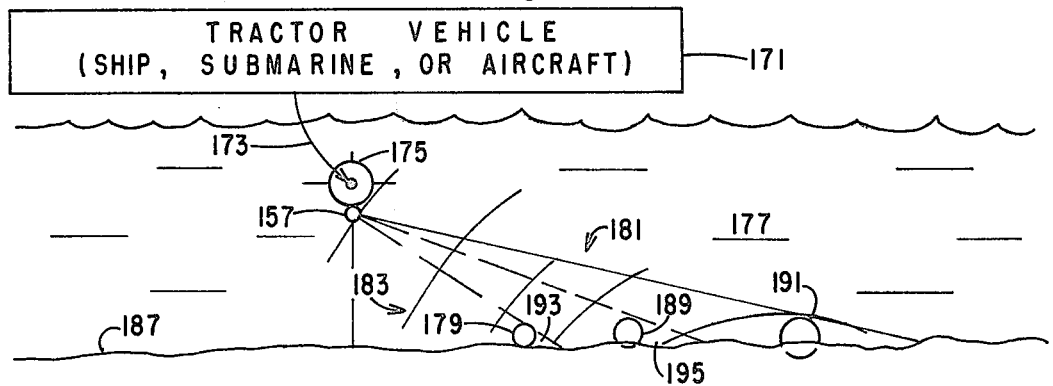
FIG. 4 illustrates an acquired target object and shadow situation which occurs during the operation of the subject side-looking sonar system.
Figure 3:
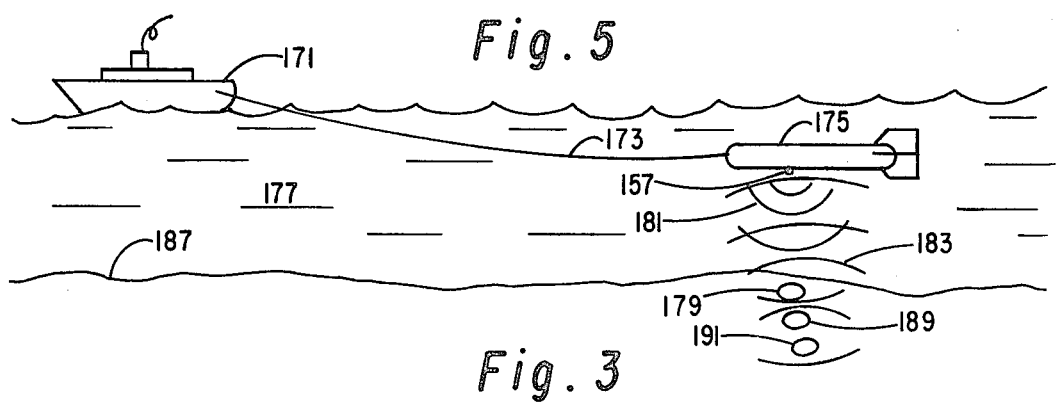
FIG. 3 discloses a typical operational situation in which the instant invention may be used to an advantage.

Referring first to FIGS. 3 and 4, there is shown a tractor vehicle 171, such as a ship or other suitable mobile device which tows by means of a combination tow cable and electrical conductor 173 and underwater vehicle 175 that has been designed to be towed and travel in a substantially stable manner along a predetermined course within water 177 in search of mines and other target objects 179. Preferably, vehicle 175 has means included therein to prevent the roll, pitch and yaw thereof while it is effectively being towed by ship 171, and, moreover, it may include an altitude control system as well.

Sonar system 151 is preferably incorporated within underwater vehicle 175, and as vehicle 175 travels along its intended course, an acoustical target search signal 181 is broadcast in a side-looking manner by transmitter 157. Due to the angular projection of said acoustical search signal, the echo 183 thereof from a target object—say, marine mine 179—and sea floor 187 constitute target and background highlights which are received by sonar 155 and processed thereby to a output signal that is utilized by alarm 9.

That volume of water (or other environment) a certain distance behind acquired mines 179, 189, and 191 constitutes acoustical shadows 193, 195, and 197, respectively, as far as the instant sonar system is concerned, and said shadows read out as a sort of blank areas having little or no sonic reflections when indicated by an oscilloscope, oscillograph, strip chart recorder, or the like, as is conventional in sidelooking sonar (and radar) systems. However, in order to effect the detection and indication of such targets and their shadows, it ordinarily requires extreme concentration on the part of human operators, something that is quite tiring and cannot be efficiently maintained over long periods of time. Thus, the alarm system of FIGS. 1(A) and 1(B) may be used to an advantage because it facilitates the detection of both the target mine's reflected highlights and shadows, thereby increasing the target detection probabilities.

Figure 5:
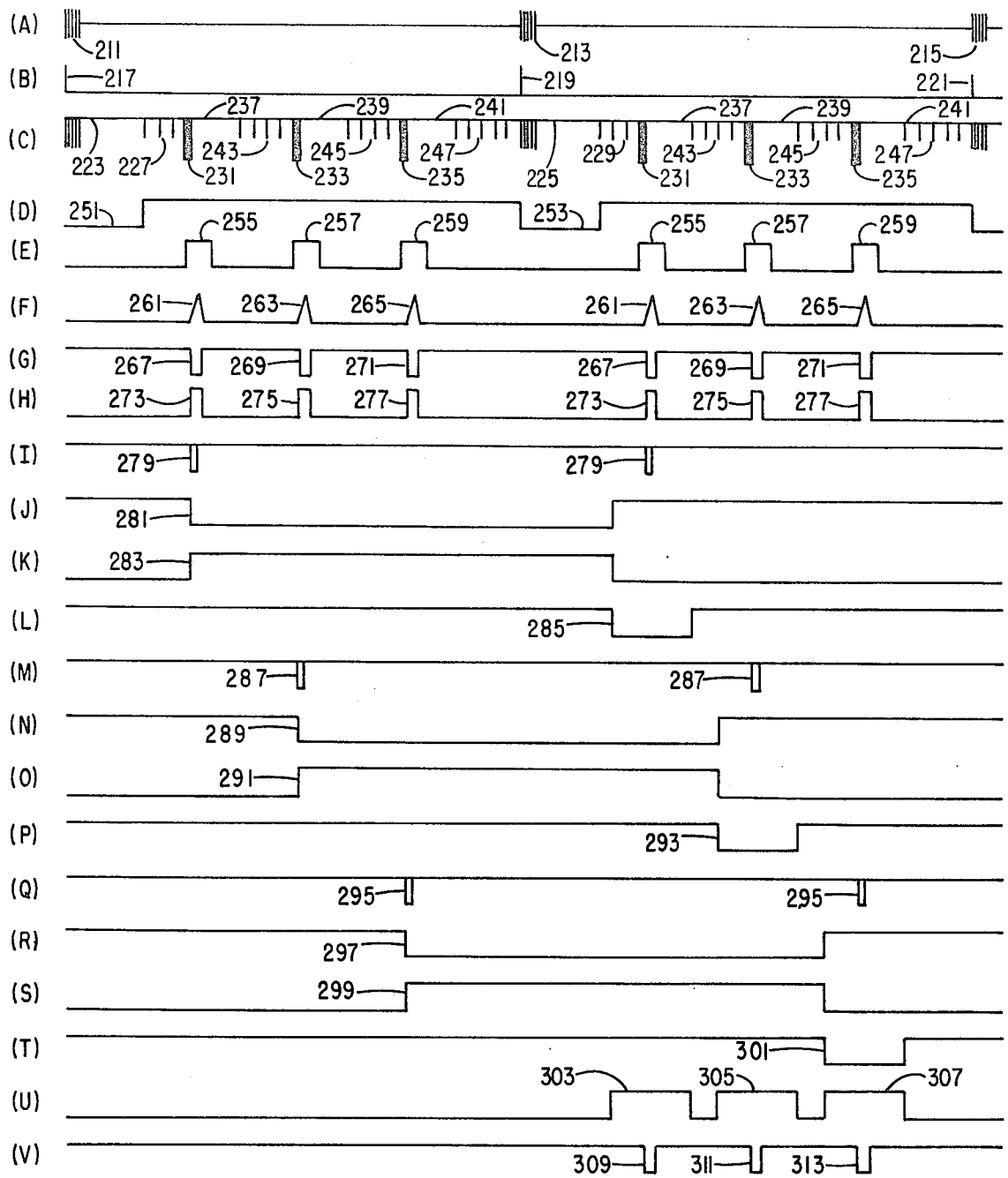
FIG. 5 graphically depicts in substantially idealized form some of the signal waveforms which emanate from various ones of the elements illustrated in FIGS. 1 and 2.

Referring now to FIGS. 1(A), 1(B), and the various and sundry signal waveforms emanating from the components thereof depicted in FIG. 5, it may readily be seen that when conventional CW sonic signals 211, 213, and 215 such as those illustrated in idealized fashion in FIG. 5(A), are broadcast as a fan-shaped, side-looking search signals (similar to that depicted as signal 181 in FIG. 4), they may be received back as signals containing echoes and shadows from first, second, and third targets shown in FIG. 3, say, as mines 179, 189, and 191, respectively.

At this time it would appear to be noteworthy that either the transmitted search pulses and the blanking signals are synchronized by the same sync generator output signals shown in FIG. 5(B), or the former triggers the latter, depending on the design choice of the artisan. However, since it is considered that the system of FIG. 2 is the preferred embodiment of the invention, the former situation will be explained herein. Hence, sync pulses 217, 219, and 221 of FIG. 5(B) are considered, in this particular case, as having been generated by sync generator 151.

As a consequence of the aforesaid search signal transmission or broadcast, receiver 155 receives targets and displays them in substantially the manner shown in FIG. 5(C). Hence, the signal of FIG. 5(C) represents the signal supplied to the data processing input of alarm 9, so as to be further processed thereby with respect to the blanking, highlight, and shadow circuits thereof, as well as being the signal that is displayed by said receiver 155.

In this particular case, the receiver output signal shown in FIG. 5(C) contains two sonar sweep representations of transmitted signals 211 and 213; blanking period signals 223 and 225; initial sea bottom reflections 227 and 229; acquired first, second, and third targets referenced in FIG. 5(C) as targets 231, 233, and 235 in both sweeps, respectively; shadow signals 237, 239, and 241 of said targets 231, 233, and 235, respectively; and, again, sea bottom reflections 243, 245, and 247, in that order from left to right. Those signals, of course, as previously suggested, actually become the data signals upon which blanking circuit 100, highlight detector 15, and shadow detector 39 operate to ascertain whether or not the aforementioned acquired targets (mines) are real or of sufficient significance to warrant the attention of a sonar operator.

Because the aforesaid sync pulses are supplied to input terminal 83 of blanking circuit 100, blanking signals 251 and 253 of FIG. 5(D) are generated thereby. Of course, the duration of each of said blanking signals is determined by the calibration and setting of single shot multivibrator 99 which, in turn, is determined by the approximate range from carrier vehicle 175 (see FIG. 3) to sea floor 187 during any given operational situation. The blanking effected by the aforesaid blanking signals 251 and 253 considerably obviate the display and processing of spurious noise that the search signal might pick up while it is traveling toward the sea floor.

When the aforementioned first, second, and third targets have been acquired during the first and second sonar sweeps, received highlight target echoes 231, 233, and 235 cause highlight detector 15 to produce positive pulses 255, 257, and 259 of FIG. 5(E), respectively, in response thereto.

At this time, it might be worthy of note that the highlights of the aforesaid target echo signals are accentuated because highlight detector 15 incorporates logic and timing circuits which automatically adjust to the level of the received bottom reflections, and, thus, a target "detect" signal is only produced for those sound reflections that have levels that are at or above some predetermined level—say, 30 percent or more—above the normal bottom reflection signal level. Moreover, because this holds true for all acquired targets, the signal-to-noise ratios with respect thereto tends to be optimized.

In addition, it should be understood that the subject invention may be designed to process the echo signals of more than three targets per sonar sweep, but only three thereof have been disclosed herein for the sake of keeping this disclosure as simple as possible. Nevertheless, it should be obvious that one skilled in the art having the benefit of the teachings presented herewith could make whatever design choices as would be necessary to process any desired number of targets per sonar sweep.

Shadow detector 39 likewise receives the signal of FIG. 5(C) and determines therefrom that no echo signals are received for a certain period of time after highlight target echoes 231, 233, and 235 were received. Then signals 261, 263, and 265 of FIG. 5(F) are timely generated in response to such conditions, respectively. Of course, the fact that no signals have been received for some period of time after the target echoes have been received is indicitative of the fact that target shadows are occurring. Hence, another of the tests have been met as evidence that the received target echo signals are, in fact, echoes of actual targets of significance.

At this time, it should be recognized that certain portions of the signal waveforms of FIGS. 5(D), 5(E), and 5(F) are all positive at the same time; and because thereof, and because they are simultaneously supplied to NAND gate 101, negative pulses 267, 269, and 271 of FIG. 5(G) are timely generated at the output thereof. Then, NAND gate 105 logically inverts said output pulses from NAND gate 101 and produces positive pulses 273, 275, and 277 shown in FIG. 5(H).

Since output signals 273, 275, and 277 from NAND gate 105 are supplied to the inputs of target range gate memories 115, 123, and 133, they are processed thereby in such manner as to distinguish between the aforesaid first, second, and third targets, inasmuch as they are respective analogs thereof. Therefore, range gate memory 115 becomes responsive to signal 273, range gate memory 123 becomes responsive to signal 275, and range gate memory 133 becomes responsive to signal 277 because each thereof has been constructed to be operative at certain target ranges.

Considering first target no. 1 range gate memory 115, when the first target analog signal 273 is supplied to one of the inputs of NAND gate 113 thereof, negative pulse 279 of FIG. 5(I) is produced thereby because at that time the other input thereof is supplied the normally positive $\bar{Q}$ output signal from single shot multivibrator 117. Then, when pulse 279 occurs, it triggers single shot multivibrator 117 to a change of state, thereby causing it to go from the aforesaid normally positive static condition to a negative condition at the $\bar{Q}$ output thereof and vice versa at the Q output thereof. Hence, negative signal 281 of FIG. 5(J) is produced at the $\bar{Q}$ output thereof, and the logically inverted positive signal 283 of FIG. 5(K) is produced at the Q output thereof.

Because the Q output of single shot multivibrator 117 is normally negative until signal 273 arrives at NAND gate 113, it supplies a negative signal to one of the inputs NAND gate 121 of target no. 2 range gate memory 123, thereby disabling it and entire range gate 123 until after the first target has been acquired. But, once Q output signal 283 goes positive as a result of the aforementioned change of state of single shot multivibrator 117, it then supplied one of the positive signals to NAND gate 121 that is necessary to enable it. And once NAND gate 121 has received positive signal 283, it is then ready to be enabled by second target analog signal 275, which, of course, is supplied to the other input thereof when the second target has been acquired.

Since single shot multivibrator 117 has been preset to automatically resume its static state after a predetermined period of time that is slightly smaller than that of the sweep times 1 and 2 of FIG. 5(A), the trailing edge of $\bar{Q}$ output signal 281 occurs prior to the acquiring of the first target during sweep no. 2. Thus, when the trailing edge of signal 281 goes positive, it triggers single shot multivibrator 119 to a change of state, thereby producing negative going signal 285 of FIG. 5(L) for a time period in accordance with the presetting of said single shot multivibrator 119. And, consequently, said negative going signal is, at that time, supplied to one of the inputs of NAND gate 141.

The operation of target no. 2 range gate memory 123 operates in a manner identical to that of the aforesaid target no. 1 range gate memory 115. Consequently, pulse 287 is timely produced by NAND gate 121, pulse 289 is timely produced at the $\bar{Q}$ output of single shot multivibrator 127, pulse 291 is produced at the Q output of single shot multivibrator 127, and pulse 293 is timely produced by the $\bar{Q}$ output of single shot multivibrator 129, as shown in FIGS. 5(M), 5(N), 5(O), and 5(P), respectively.

Likewise, the operation of target no. 3 range gate memory operates in a manner similar to that of range gate memories 115 and 123; consequently, pulses 295 of FIG. 5(Q), 297 of FIG. 5(R), 299 of FIG. 5(S), and 301 of FIG. 5(T) are timely and respectively produced by NAND gate 131, single shot multivibrator 137, and single shot multivibrator 139.

In this particular case, only three target range gates are used; however, as previously mentioned, more or less thereof may be incorporated in the subject invention if so desired. Hence, in this case single shot multivibrator 137 of target no. 3 range gate 133 contains no Q output, inasmuch as no fourth target range gate memory has been used. Obviously, regardless of the number of target range gate memories used, the last one contains no operative Q output signal.

Whenever any one of the input signals to NAND gate 141 goes negative, a positive signal occurs as the output thereof. Therefore, signals 303, 305, and 307 of FIG. 5(U) are respectively generated by the negative going input signals 285 of FIG. 5(L), 293 of FIG. 5(P), and 301 of FIG. 5(T), all of which has been timely supplied thereto by single shot multivibrators 119, 129, and 139, respectively.

The coincidence of each of the aforesaid acquired first, second, and third positive target analog signals, shown as pulses 273, 275, and 277 in the second sweep of FIG. 5(H), with positive pulses 303, 305, and 307 of FIG. 5(U) causes NAND gate 143 to timely produce negative pulses 309, 311, and 313 of FIG. 5(V) at the output thereof. And, of course, such coincidence indicates that three targets of significance—in this case, marine mines 179, 189, and 191 illustrated in FIG. 3— have been detected, which should be brought to the attention of the human or other operator monitoring the subject sonar system.

In order to be emphatic in its target indication, the three pulses referenced as pulses 309, 311, and 313 are used to trigger single shot multivibrator 147, the latter of which is preset to a long enough period that its state remains unchanged during the existence of said three pulses of FIG. 5(V). Because the period setting of single shot multivibrator is so long, said input signal overlapping occurs; however, the advantage thereof is that it causes sonic alarm to ring continuously during the reception of the echoes from the three acquired targets. Consequently, the alarm is more effective.

Because the change of state period setting of single shot multivibrator is, as previously indicated, made so long, no representative signal waveform therefor has been depicted in FIG. 5, since it would run off the drawing sheet.

From the foregoing, it may readily be seen that the subject invention constitutes a new and unique sonar alarm system which, in turn, constitutes an advancement in the art, inasmuch as it determines if a target has been acquired and if said target contains a sonic shadow behind it when scanned by a side-scanning solar system.

Obviously, many modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. In combination with a reflective object detecting sonar system including transmitter means for projecting pulses of sonic energy at predetermined sweep intervals and receiver means for providing first electrical signals representative of reflected sonic energy, a target alarm system comprising:

highlight detector means, responsive to said first electrical signals, for providing a second electrical signal corresponding to each highlight reflection of at least a predetermined strength;

shadow detector means, responsive to said first electrical signals, for providing a third electrical signal corresponding to each substantial absence of reflected energy for a predetermined time period;

single shot means, responsive to said second electrical signals, for providing a fourth electrical signal for a predetermined time period after initiation;

coincidence gate means, responsive to coincidence of said second and said fourth electrical signals, for providing fifth electrical signals each representative of a detected highlight reflection followed by a detected shadow, said fifth electrical signals occurring at times in a given sweep interval corresponding to the ranges of reflective objects giving rise to detected highlights and associated shadows;

range memory means, responsive to occurrences of said fifth electrical signals in a given sweep interval, for initiating sixth electrical signals at times in the following sweep interval corresponding to said ranges; and target alarm means, responsive to coincidence of at least one of said fifth signals and a corresponding one of said sixth signals, for providing a perceptible output signal corresponding to detection of a highlight and associated shadow at substantially the same range on at least two successive sweeps.

2. The combination defined in claim 1, and wherein said range memory means comprises:

at least a first range memory circuit;

said first range memory circuit comprising a coincidence gate, a first single-shot element and a second single-shot element;

said coincidence gate being responsive to a first of said fifth electrical signals in a given sweep interval to trigger said first single-shot element to change from a first state to a second state for a first predetermined period of a length slightly less than one of said sweep intervals, said coincidence gate being disabled by said second state for said first predetermined period, and said second single-shot element being responsive to termination of said first predetermined period to provide a first of said sixth electrical signals during said sweep interval following said given sweep interval.

3. The combination defined in claim 2 and wherein said range memory means comprises a plurality of additional range memory circuits connected in parallel with said first range memory circuit between said coincidence gate means and said target alarm means; each of said additional memory circuits comprising a coincidence gate, a first single-shot element and a second single-shot element corresponding to those of said first range memory circuit; and the coincidence gates of said additional range memory circuits each being responsive to the state of the first single-shot element of the next preceding range memory circuit whereby successive ones of said fifth electrical signals in said given sweep interval trigger said first single-shot elements of successive ones of said range memory circuits to change from a first state to a second state for additional predetermined periods of lengths slightly less than said sweep intervals, and said second single-shot elements of said additional range memory circuits being responsive to terminations of the corresponding additional predetermined periods to provide successive ones of said sixth electrical signals during said sweep interval following said given sweep interval.

* * * * *